May 8, 1923.
H. O. TAFT
SPOOL
Filed May 9, 1922
1,454,796
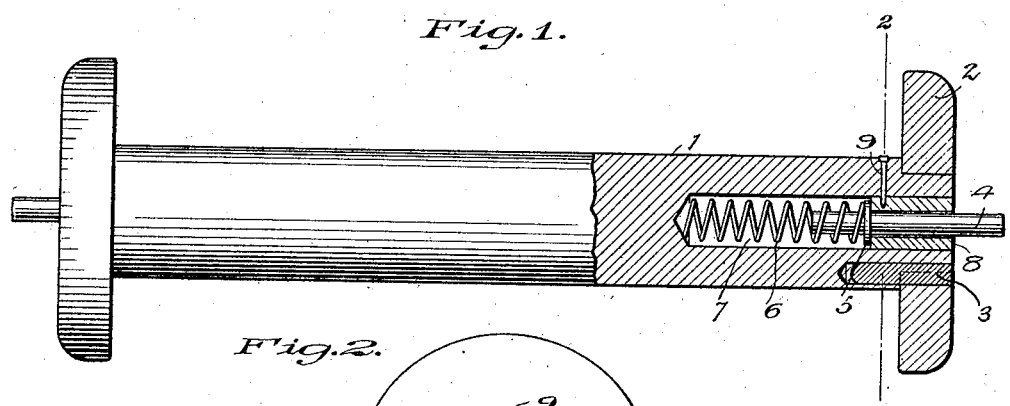
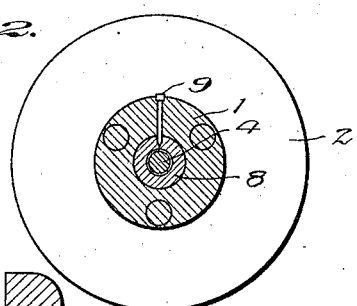
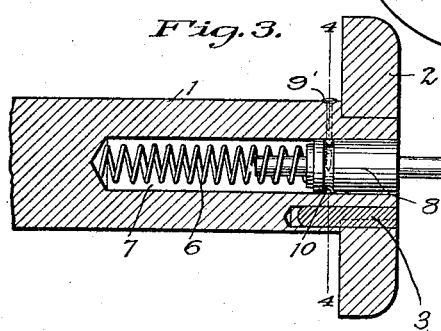 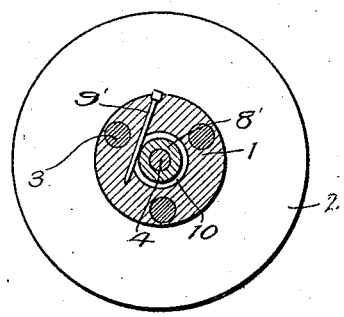
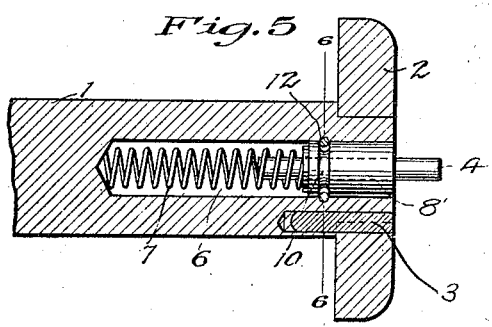 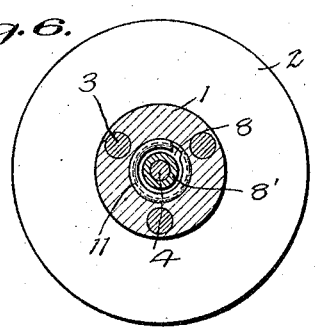
WITNESSES
E. A. Wilson
A. L. Kitchin
INVENTOR
H. O. Taft
BY
ATTORNEYS Patented May 8, 1923.

1,454,796

UNITED STATES PATENT OFFICE.

HERBERT OTHRO TAFT, OF BURLINGTON, VERMONT.

SPOOL.

Application filed May 9, 1922. Serial No. 559,686.

*To all whom it may concern:*

Be it known that I, HERBERT O. TAFT, a citizen of the United States, and a resident of Burlington, in the county of Chittenden and State of Vermont, have invented a new and Improved Spool, of which the following is a full, clear, and exact description.

This invention relates to spools and particularly to an improved bushing and retaining means therefor and has for an object to provide a construction which is simple but very effective in the way it retains the parts together.

Another object of the invention is to provide a bushing and securing member coacting therewith which will positively retain the bushing in place without the use of glue or other adhesive.

In the accompanying drawing—

Figure 1 is a side view of a spool constructed according to the present invention, certain parts being broken away and shown in section for illustrating the detail construction thereof.

Figure 2 is a sectional view through Figure 1 approximately on line 2—2.

Figure 3 is a view similar to one end of the structure shown in Figure 1 but showing a slight modified construction.

Figure 4 is a sectional view through Figure 3 on line 4—4.

Figure 5 is a view similar to Figure 3 but showing another modified construction.

Figure 6 is a sectional view through Figure 5 on line 6—6.

Referring to the accompanying drawing by numerals, 1 indicates the body of a spool and 2 the ends which are held in place in any suitable manner, as for instance, by the pins 3. In order that the spools may properly operate, metal journal pins 4 are provided which pins are formed with stops or enlargements 5 designed to engage the spring 6 arranged in the bore 7, said spring also engaging the body 1 at the bottom of the bore. When the parts are arranged in the position shown in Figure 1, the spring resiliently holds the journal pin 4 in an outer position but permits it to be readily forced inwardly at any time.

In order to provide a proper bearing surface for the pins 4, a bearing sleeve or bushing 8 is provided said bushing being usually of wood though it may be of any desired material. Heretofore this bushing was held in place by glue. Where glue is used the bushing becomes loose rather often and, therefore, fails to perform its function properly as it will oftentimes move out on the pin 4 and drop off when the spool is not in use. To obviate the loss or dislodgment of the bushing, a nail or other retaining member 9 is forced through the body 1 and directly into the bushing. It is, of course, understood that a screw or other member could be used though ordinarily a small nail will perform the function properly and in this specification and claims where the term "nail" is used, it is to be understood that a screw or other member might be substituted. In order that the nail may not strike or press the pin 4 it is preferably of a proper length to be positioned as shown in Figure 1 when fully driven in.

In Figures 3 and 4 a slight modified structure is provided wherein the sleeve 8' is provided with an annular groove 10 designed to accommodate the nail 9' which nail is much longer than the nail 9 shown in Figure 1 and which is driven in at a tangent (Fig. 4) whereby it may have a section resting in the groove 10. This will prevent the longitudinal movement of the sleeve 8' while causing it to perform its usual functions.

In Figures 5 and 6 a further modified construction is shown designed to accomplish the same result, namely, to hold the sleeve in place. In this form of the invention the sleeve 8' accommodates an arc-shaped or parti-circular retaining member 11. An annular groove 12 is provided in body 1 opposite the groove 10 so that when the member 11 is contracted into the groove 10 it may be forced into the bore 6 until it reaches the groove 12 whereupon it will snap into said groove and overlap sufficiently to present a stop for the sleeve 8'.

What I claim is:—

1. In a spool formed with a longitudinal bore in the end thereof, a sleeve or bushing fitting in said bore, said sleeve having an annular groove adjacent its inner end, a journal pin extending through said sleeve, a stop integral with said journal pin adapted to engage the inner end of said sleeve to limit the outward movement of the journal pin, a spring arranged in said bore coacting against said stop for causing said stop to resiliently engage the inner end of said sleeve, and a sleeve-retaining member passing through the spool and fitting in said groove to hold the sleeve against longitudinal movement.

2. In a spool of the class described formed with a longitudinally-extending bore at the end, a sleeve fitting in said bore, a journal pin formed with a stop intermediate its ends, passing through said sleeve with its stop normally bearing against the inner end of the sleeve, said stop being adapted to limit the outward longitudinal movement of the journal pin, a spring arranged in said bore between the rear wall thereof and the stop of the journal pin for resiliently holding the journal pin in its most outward position, and means co-acting with the sleeve and the spool for retaining the sleeve in place.

HERBERT OTHRO TAFT.